United States Patent [19]
Slack et al.

[11] Patent Number: 5,859,163
[45] Date of Patent: Jan. 12, 1999

[54] ALLOPHANATE GROUP-CONTAINING POLYISOCYANATES IMPROVED COMPATIBILITY WITH ALDIMINES

[75] Inventors: William E. Slack, Moundsville, W. Va.; Edward P. Squiller, Pittsburgh; Hans Georg Schmelzer, Coraopolis, both of Pa.

[73] Assignee: Bayer Corporation, Pittsburgh, Pa.

[21] Appl. No.: 917,455

[22] Filed: Aug. 22, 1997

[51] Int. Cl.⁶ .................................................. C08G 18/30
[52] U.S. Cl. ................. 528/49; 528/67; 528/68; 252/182.2; 252/182.21; 252/182.22; 560/115; 560/132; 560/158; 560/159
[58] Field of Search ................. 528/49, 68, 67; 252/182.2, 182.21, 182.22; 560/115, 132, 158, 159

[56] References Cited

U.S. PATENT DOCUMENTS

| | | | |
|---|---|---|---|
| 3,769,318 | 10/1973 | Windemuth et al. | 260/471 C |
| 4,160,080 | 7/1979 | Köenig et al. | 528/59 |
| 4,177,342 | 12/1979 | Bock et al. | 528/45 |
| 4,810,820 | 3/1989 | Slack et al. | 560/27 |
| 5,466,771 | 11/1995 | Hicks et al. | 528/64 |
| 5,516,873 | 5/1996 | Hicks et al. | 528/60 |
| 5,523,376 | 6/1996 | Hicks et al. | 528/44 |

FOREIGN PATENT DOCUMENTS

| | | |
|---|---|---|
| 44 16 321 | 11/1995 | Germany . |
| 994890 | 6/1965 | United Kingdom . |

Primary Examiner—Rachel Gorr
Attorney, Agent, or Firm—Joseph C. Gil; Thomas W. Roy

[57] ABSTRACT

The present invention relates to coating compositions containing
a) aldimines and
b) polyisocyanates which
   i) contain 2 to 35% by weight of allophanate groups, based on the weight of the polyisocyanates,
   ii) have a viscosity of less than 3000 mpa.s at 25° C. when measured at a solids content of 100%,
   iii) are based on the reaction products of aliphatic polyisocyanates with
      1) 10 to 90 mole percent of monohydroxy compounds and
      2) 10 to 90 mole percent of polyhydric alcohols, wherein the mole percentages of 1) and 2) add up to 100, and the percentages are based on the total moles of monohydroxy compounds 1) and polyhydric alcohols 2) and
   iv) contain less than 10 mole percent of urethane groups, based on the total moles of urethane groups obtained from monohydroxy compounds 1) and polyhydric alcohols 2).

The present invention also relates to these polyisocyanates containing allophanate groups and to polyisocyanate mixtures containing these polyisocyanates and polyisocyanate adducts containing isocyanurate, uretdione, biuret and/or urethane groups.

20 Claims, No Drawings

ALLOPHANATE GROUP-CONTAINING POLYISOCYANATES IMPROVED COMPATIBILITY WITH ALDIMINES

BACKGROUND OF THE INVENTION

1. Field of the Invention

The present invention relates to allophanate group-containing polyisocyanates which not only have excellent compatibility with aldimine co-reactants, but are also useful for improving the compatibility of other polyisocyanates with aldimine co-reactants, and to their use in coating compositions.

2. Description of the Prior Art

Coating compositions based on mixtures of polyisocyanates and aldimines are known. One of the disadvantages of these compositions is the compatibility between the polyisocyanate and the aldimine, which is necessary to obtain clear, high gloss coatings. Depending upon the particular co-reactants, the mixtures range from totally incompatible systems to those which exhibit a minor amount of cloudiness. The former are totally unsuitable for the production of coatings, while the latter result in coatings which are either hazy in appearance or suffer from a lack of gloss.

The compatibility problem between polyisocyanates and aldimines is addressed in U.S. Pat. Nos. 5,466,771; 5,516,873; and 5,523,376. U.S. Pat. No. 5,466,771 describes certain allophanate-modified polyisocyanates containing isocyanurate groups that possess improved compatibility with aldimines. Similarly U.S. Pat. No. 5,523,376 describes certain uretdione-modified polyisocyanates that possess improved compatibility with aldimines. Finally, U.S. Pat. No. 5,516,873 describes the use of polyaspartic acid esters to improve the compatibility between polyisocyanates and aldimines.

While it is possible to blend the polyisocyanates described in U.S. Pat. Nos. 5,446,771 and 5,523,376 with aldimines to obtain coating compositions that are suitable for the production of acceptable coatings, there is a need to further improve their compatibility with aldimines, such as the aldimine based on 1,6-hexamethylene diamine (HDA).

Accordingly, it is an object of the present invention to provide polyisocyanates that are not only compatible with aldimines, such as the HDA aldimine, such that the resulting coating compositions can be used to prepare coatings having a high gloss, but can also be blended with incompatible polyisocyanates to improve their compatibility with aldimines.

This object may be achieved with the polyisocyanates according to the present invention, which contain allophanate groups, are substantially free of urethane groups, have a low viscosity and are prepared by reacting an aliphatic polyisocyanate with a mixture of monohydroxy compounds and polyhydric alcohols, preferably linear or branched, aliphatic monohydric and polyhydric alcohols.

Processes for the production of polyisocyanates containing allophanate groups are described in British Patent 994,890; U.S. Pat. Nos. 3,769,318, 4,160,080, 4,177,342 and 4,810,820; and German Offenlegungsschrift 4,416,321. While some of these patents disclose that mixtures of monoalcohols and polyhydric alcohols may be used to prepare polyisocyanates containing allophanate groups and/or contain examples describing polyisocyanates prepared from mixtures of monoalcohols and polyhydric alcohols, none of these patents are directed to improving the compatibility between polyisocyanates and HDA aldimines and do not recognize the particular requirements that are necessary to achieve this compatibility.

Polyisocyanates containing allophanate groups and prepared from a mixture of monoalcohols and polyhydric alcohols are described in certain examples of U.S. Pat. No. 4,810,820. The percentage of urethane groups converted to allophanate groups, which is set forth in the tables, was obtained by determining the reduction in the NCO content after urethane formation. This calculation is based on the assumption that every isocyanate group that was consumed reacted with a urethane group to form an allophanate group. However, this assumption is not accurate. For example, isocyanate groups can react with other isocyanate groups to form uretdione groups or isocyanurate groups. The examples set forth hereinafter demonstrate that contrary to the polyisocyanates of the present invention, the products of U.S. Pat. No. 4,810,820 are not substantially free of urethane groups.

SUMMARY OF THE INVENTION

The present invention relates to coating compositions containing
a) aldimines corresponding to the formula

wherein
- X represents an organic group which has a valency of n and is inert towards isocyanate groups at a temperature of 100° C. or less,
- $R_1$ and $R_2$ may be the same or different and represent organic groups which are inert towards isocyanate groups at a temperature of 100° C. or less, or $R_1$ and $R_2$ together with the β-carbon atom form a cycloaliphatic or heterocyclic ring and
- n represents an integer with a value of at least 2, and b) polyisocyanates which
  i) contain 2 to 35% by weight of allophanate groups, based on the weight of the polyisocyanates,
  ii) have a viscosity of less than 3000 mPa.s at 25° C. when measured at a solids content of 100%,
  iii) are based on the reaction products of aliphatic polyisocyanates with
    1) 10 to 90 mole percent of monohydroxy compounds and
    2) 10 to 90 mole percent of polyhydric alcohols, wherein the mole percentages of 1) and 2) add up to 100, and the percentages are based on the total moles of monohydroxy compounds 1) and polyhydric alcohols 2) and
  iv) contain less than 10 mole percent of urethane groups, based on the total moles of urethane groups obtained from monohydroxy compounds 1) and polyhydric alcohols 2).

The present invention also relates to these polyisocyanates containing allophanate groups and to polyisocyanate mixtures containing these polyisocyanates and polyisocyanate adducts containing isocyanurate, uretdione, biuret and/or urethane groups.

DETAILED DESCRIPTION OF THE INVENTION

Starting materials for preparing the polyisocyanates containing allophanate groups are (i) organic compounds containing urethane groups and (ii) organic polyisocyanates containing aliphatically bound isocyanate groups. It is possible in accordance with the present invention to prepare polyisocyanates containing allophanate groups in one step by using an excess of organic polyisocyanates (ii) to prepare organic compounds (i).

Organic compounds (i) are selected from compounds which may optionally contain isocyanate groups, have a urethane group content (calculated as $CHNO_2$, molecular weight 59) of 1 to 60% by weight and preferably from 1 to 40% by weight and do not contain isocyanate-reactive groups other than the urethane groups.

Suitable compounds include urethane-containing compounds which have been obtained by the reaction of amines containing primary amino groups with chloroformic acid esters. However, the compounds containing urethane groups are preferably reaction products of isocyanates, preferably polyisocyanates, with a mixture of monohydroxy compounds and polyhydric alcohols, preferably linear or branched monohydric and polyhydric alcohols.

In a preferred embodiment of the process according to the invention the urethane starting materials are prepared in situ from monohydroxy compounds and polyhydric alcohols and excess quantities of aliphatic polyisocyanates. The resulting reaction mixture contains the second main component of the process according to the invention, i.e., the aliphatic polyisocyanate, which was used in excess in the preparation of the urethane.

Preferred compounds containing urethane groups to be used as starting materials in the process according to the invention include those corresponding to the general formula:

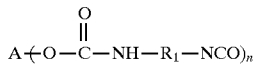

wherein
    A is the residue obtained by the removing the hydroxy group from a monohydroxy compound or the residue obtained by removing the hydroxy groups from an n-functional polyhydric alcohol, preferably a mixture of linear or branched, aliphatic alcohols, which apart from the hydroxy groups do not contain any other isocyanate-reactive groups,
    $R_1$ represents the residue obtained by removing the isocyanate groups from a polyisocyanate, preferably a diisocyanate, containing aliphatically bound isocyanate groups and
    n is an integer of 1 to 4.

Also suitable are mixtures of urethane-containing compounds corresponding to the above formula with up to 50% by weight, based on the weight of the mixture, of higher homologs of these compounds formed by chain-extending reactions, i.e., higher molecular weight NCO prepolymers.

The particularly preferred isocyanate-containing urethanes to be used in the process according to the invention generally contain 1 to 40% by weight of urethane groups and 1 to 30% by weight of isocyanate groups, and the substituents A and $R_1$ are aliphatic hydrocarbon radicals, which may optionally contain ether and/or ester groups.

The isocyanate-containing urethanes corresponding to the above formula are preferably obtained by reacting hydroxyl-containing compounds corresponding to the formula:

$A(OH)_n$ with diisocyanates corresponding to the formula:

$R_1(NCO)_2$,

The reactants are used in quantities corresponding to an NCO:OH equivalent ratio of at least 1.1:1, preferably at least 1.8:1 and more preferably 2:1 to 100:1. The aliphatic polyisocyanates are reacted with a mixture of alcohols containing
    i) 10 to 90, preferably 20 to 80 and more preferably 30 to 70 mole percent of a monohydroxy compound, preferably a linear or branched, aliphatic monohydric alcohol and
    ii) 10 to 90, preferably 20 to 80 and more preferably 30 to 70 mole percent of a polyhydric alcohol, preferably a linear or branched, aliphatic polyhydric alcohol, wherein the mole percents of i) and ii) add up to 100, and the percentages are based on the total moles of monohydroxy compounds and polyhydric alcohols.

It is also possible, although less preferred, to use urethane-containing compounds which optionally contain no isocyanate groups and which have been obtained by reacting hydroxyl compounds, $A(OH)n$, with monoisocyanates and/or more than difunctional polyisocyanates, optionally in admixture with diisocyanates.

The urethane-containing starting materials required for the process according to the invention are produced by well-known methods of polyurethane chemistry, i.e., in particular by simple heating of the starting materials to 40° to 150° C., preferably to 50° to 100° C. This reaction may optionally be catalyzed by known urethanization catalysts, although the reaction is preferably carried out in the absence of catalysts or by using the catalysts employed for the allophanatization reaction, which are described hereinafter.

Suitable monohydroxy compounds are those having a molecular weight of 32 to 400, preferably 32 to 250, and containing one hydroxy group and optionally ether and/or ester groups. Examples include phenols, such as phenol, α-naphthol and cresol, and preferably alcoholic monohydroxy compounds and more preferably linear or branched, aliphatic alcohols. Examples include methanol, ethanol, propanol, isopropanol, allyl alcohol, the isomeric butanols, pentanols, hexanols and heptanols, 2-ethylhexanol and fatty alcohols containing 10 to 20 carbon atoms. Also suitable are cycloaliphatic alcohols such as cyclopentanol, cyclohexanol, methyl cyclohexanol, trimethyl cyclohexanol and 4-tert.butyl cyclohexanol, and araliphatic alcohols such as benzyl alcohol, phenyl-ethyl alcohol and 3-phenyl propanol.

Suitable polyhydroxyl compounds $A(OH)_n$, include low molecular weight alcohols, preferably aliphatic alcohols, having a molecular weight of 62 to 400, preferably 62 to 250, and containing 2 to 4 hydroxyl groups and optionally ether and/or ester groups. Examples include ethylene glycol, propane-1,2- and -1,3-diol, butane-1,2-, -1,3- and -1,4-diol, pentane-1,5-diol, neopentyl glycol, hexane-1,6- and -2,5-diol, 3-methylpentane-1,5-diol, 2-methyl-2-propylpropane-1,3-diol, 2,2-diethylpropane-1,3-diol, 2-ethylhexane-1,3-diol, 2,2,4-trimethylpentane-1,3-diol, trimethylhexane-1,6-diol, decane-1,10-diol, dodecane-1,12-diol, 2-methylbutane-1,4-diol, 2-methylpropane-1,3-diol, glycerol, butanetriol, 2-hydroxymethyl-2-methylpropane-1, 3-diol, hexane-1,2,6-triol, trimethylol ethane, trimethylol propane, pentaerythritol, ethylene glycol monoalkyl or monoaryl ether, propylene glycol monoalkyl ether, diethylene glycol, triethylene glycol and tetraethylene glycol.

Also suitable are cycloaliphatic alcohols such as 1,2-, 1,3- and 1,4-cyclohexanediol, 2,4-dihydroxy-1,1,3,3-tetramethyl cyclobutane, 1,4-bis-(hydroxymethyl)-cyclohexane, bis-(4-hydroxycyclohexyl)-methane, 2,2-bis-(4-hydroxy-cyclohexyl)-propane, 2,4-bis-(4-hydroxycyclohexyl)-2-methylpentane and bis-(hydroxymethyl)-tricyclodecane; and araliphatic alcohols such as 4,4'-bis-(2-hydroxyethyl)-diphenyl methane.

Mixtures monohydroxy compounds and/or mixtures of polyhydric alcohols may also be used. By using different mixtures in the process according to the invention, the functionality of the allophanate polyisocyanate can be varied.

Suitable diisocyanates for use in the production of the urethane-containing compounds used as starting materials in the process according to the invention and as reactants for these urethane-containing compounds correspond to the formula:

wherein
R$_1$ is an aliphatic hydrocarbon radical containing 2 to 20, preferably 6 to 10 carbon atoms.

Examples of these isocyanates include 1,2-diisocyanatoethane, 1,4-diisocyanatobutane, 1,6-diisocyanatohexane, 1,11-diisocyanatoundecane, 2,2,4- and 2,4,4-trimethyl-1,6-diisocyanatohexane and 4-isocyanantomethyl-1,8-octamethylene diisocyanate. These diisocyanates may be used both in the production of the urethane-containing compounds and for the subsequent formation of allophanate groups. 1,6-diisocyanatohexane (HDI) is particularly preferred.

Monoisocyanates, such as n-hexyl isocyanate or cyclohexyl isocyanate, may also be used in the production of the urethane-containing compounds serving as starting materials, but not as reactants for these compounds in the process according to the invention. However, these monoisocyanates, if they are used, are preferably used in combination with polyhydric alcohols to form the starting compounds containing urethane groups.

Mixtures of isocyanates may be used both in the production of the starting materials containing urethane groups and as reactants for these starting materials, provided that monoisocyanates are not used as reactants for preparing the urethane-containing compounds. The use of monoisocyanates reduces the NCO functionality of the products obtained by the process according to the invention. The functionality of the products obtained by the process according to the invention can be varied through the choice of certain mixing ratios between the isocyanate components and through the choice of the mixing ratio between hydroxyl compounds.

The compounds containing urethane groups can be converted to the corresponding polyisocyanates containing allophanate groups by any of the prior art methods, e.g., those disclosed in British Patent 994,890; U.S. Pat. Nos. 3,769, 318, 4,160,080, 4,177,342 and 4,810,820 (the disclosures of which are herein incorporated by reference); and preferably German Offenlegungsschrift 4,416,321, which discloses conducting the allophanatization reaction in the presence of tin compounds.

These tin compounds are tin salts and organotin compounds. Preferred tin compounds are tin compounds, which are soluble in the reaction mixture and have a tin content of 10 to 65% by weight, in particular, tin(II) and organotin salts of organic acids and also tin(II) halides. Examples of preferred tin compounds are tin(II) chloride, bromide and iodide, tin(II) octanoate and tin(II) 2-ethylhexanoate. Tin(II) salts of organic acids, such as tin(II) n-octanoate and tin(II) 2-ethylhexanoate, are particularly preferred. Also suitable are zinc salts such as zinc octoate and zinc acetylacetonate.

The allophanatization catalysts are used in quantities of 0.001 to 5.0% by weight, preferably 0.01 to 1.0% by weight, based on the total weight of the reactants, in the process according to the invention.

The tin compounds may be incorporated in the reaction mixture by any suitable method. For example, the tin compound may be mixed with the hydroxyl compound before the preparation of the compound containing urethane groups. In cases where a two-stage process is used, the tin compound may also be added to the reaction mixture before the preparation of the allophanate compounds.

To carry out the process according to the invention, the reactants are generally used in such quantities that there are 2 to 50, preferably 3 to 20, isocyanate groups of the polyisocyanate component for every urethane group of the compound containing urethane groups. Accordingly, where the compound containing urethane groups is prepared in situ, a corresponding excess of the isocyanate component is used.

The reaction according to the invention generally takes place at temperatures of 50° to 140° C. The course of the reaction according to the invention may be followed by determining the NCO content of the reaction mixture. The reaction may be terminated after the urethane groups have been substantially converted to allophanate groups, for example, by cooling to room temperature. "Substantially" converted means that less than 10 mole percent, preferably less than 5 mole percent and more preferably less than 2 mole percent, of the urethane groups have not been converted to allophanate groups. The products according to the invention preferably have a content of urethane groups (calculated as CHNO$_2$, molecular weight 59) of 1% by weight, more preferably less than 0.5% by weight, based on the weight of the polyisocyanates according to the invention.

In a preferred embodiment of the process according to the invention the starting compound containing urethane groups is prepared in situ. In this process a diisocyanate, which is preferably used as the isocyanate component, is initially introduced at 50° to 80° C. and the hydroxyl component is added dropwise in liquid form with thorough stirring. If the same isocyanate or isocyanate mixture is to be used both for urethanization and for allophanatization, it is initially used in an amount such that the NCO/OH equivalent ratio is 3:1 to 15:1.

On completion of the urethane reaction (monitored by determining the NCO content), the temperature is increased to 80° to 140° C. and the catalyst (e.g., a tin compound) is added. The reaction mixture is stirred until the NCO content has fallen to the value calculated for complete allophanatization. The catalyst may also be initially introduced together with the isocyanate or added together with the hydroxyl compound.

If the polyisocyanate containing allophanate groups is to be freed from excess diisocyanate, this may be done either by thin-layer distillation or by fractional extraction, for example, using n-hexane or cyclohexane as extractant. Removal of excess diisocyanate by distillation is preferred.

The type of starting materials used and the quantities in which they are used in the process according to the invention are generally selected so that the polyisocyanates have an allophanate group content of 2 to 35%, preferably 5 to 30% and more preferably 10 to 30%, by weight, based on the weight of the polyisocyanates; a viscosity of less than 3000 mPa.s, preferably less than 2000 mPa.s and more preferably less than 1500 mPa.s; and a preferred functionality of at least 2, more preferably 2.2 to 4 and most preferably 2.5 to 3.5. The products are distinguished by excellent stability during the thin-layer treatment, even at temperatures of 180° C. and higher.

The process according to the invention may be carried out continuously by arranging several reactors in tandem in the form of a cascade. Diisocyanate, hydroxyl compound and catalyst are continuously introduced into the first reactor. Adjustment of the temperature and the throughput ensures that the reaction is complete on leaving the last reactor. The crude product then passes through a thin-layer evaporator where it is freed from excess diisocyanate which is returned to the first reactor.

The end products of the process according to the invention are distinguished by a low color value, high light stability and color stability and by comparatively low viscosity.

When prepared using the preferred tin or zinc catalysts, the products have excellent storage stability and they do not have any tendency to eliminate monomeric starting isocyanate. The products also have excellent compatibility with aldimines, in particular the HDA aldimine, and can also be used to improve the compatibility of other polyisocyanates with HDA aldimines.

The polyisocyanates according to the present invention are suitable for improving the compatibility of other known polyisocyanate adducts with aldimines. Suitable polyisocyanate adducts are those containing isocyanurate, uretdione, biuret and/or urethane groups. The polyisocyanates adducts have an average functionality of 2 to 6 and an NCO content of 5 to 30% by weight. Examples of suitable polyisocyanates adducts are disclosed in U.S. Pat. No. 5,516,873, herein incorporated by reference.

The polyisocyanates according to the invention are blended with the polyisocyanates adducts in an amount sufficient to improve the compatibility of these polyisocyanates adducts with aldimines, i.e., in an amount of at least 10% by weight, preferably at least 20% by weight and more preferably at least 40% by weight, based on resin solids of the polyisocyanate mixture. The polyisocyanate adducts are present in an amount of at least 10% by weight, based on the resin solids of the polyisocyanate mixture.

The products obtained from the process according to the invention are valuable starting materials for the production of polyisocyanate addition products, preferably polyurea coatings.

Suitable aldimines include those prepared from an aldehyde and polyamines corresponding to the formula

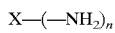

wherein
X represents an organic group which has a valency of n and is inert towards isocyanate groups at a temperature of 100° C. or less, preferably a divalent hydrocarbon group obtained by the removal of the amino groups from an aliphatic, araliphatic or cycloaliphatic polyamine, more preferably a diamine, and
n represents an integer with a value of at least 2, preferably 2 to 6, more preferably 2 to 4 and most preferably 2.

The polyamines include high molecular weight amines having molecular weights of 400 to about 10,000, preferably 800 to about 6,000, and low molecular weight amines having molecular weights below 400. The molecular weights are number average molecular weights ($M_n$) and are determined by end group analysis (NH number). Examples of these polyamines are those wherein the amino groups are attached to aliphatic, cycloaliphatic, araliphatic and/or aromatic carbon atoms.

Suitable low molecular polyamines starting compounds include ethylene diamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 2,5-dimethyl-2,5-hexane diamine, 2,2,4-and/or 2,4,4-trimethyl-1,6-hexane diamine, 1,7-heptane diamine, 1,8-octane diamine, 1,9-nonane diamine, 1,10-decane diamine, 1,11-undecane diamine, 1,12-dodecane diamine, 1-amino-3-aminomethyl-3,5,5-trimethyl cyclohexane, 2,4- and/or 2,6-hexahydrotoluylene diamine, 2,4'- and/or 4,4'-diamino-dicyclohexylmethane, 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 1,3- and/or 1,4-cyclohexane diamine, 1,3-bis(methylamino)-cyclohexane, 1,8-p-menthane diamine, hydrazine, hydrazides of semicarbazido carboxylic acids, bis-hydrazides, bis-semicarbazides, phenylene diamine, 2,4- and 2,6-toluylene diamine, 2,3- and 3,4-toluylene diamine, 2,4'- and/or 4,4'-diaminodiphenyl methane, higher functional polyphenylene polymethylene polyamines obtained by the aniline/formaldehyde condensation reaction, N,N,N-tris-(2-amino-ethyl)-amine, guanidine, melamine, N-(2-aminoethyl)-1,3-propane diamine, 3,3'-diamino-benzidine, polyoxypropylene amines, polyoxyethylene amines, 2,4-bis-(4'-aminobenzyl)-aniline and mixtures thereof.

Preferred polyamines are 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, 1,6-diamino-hexane, 2-methyl pentamethylene diamine and ethylene diamine. 1,6-diaminohexane is particularly preferred.

Suitable high molecular weight polyamines correspond to the polyhydroxyl compounds used to prepare the NCO prepolymers with the exception that the terminal hydroxy groups are converted to amino groups, e.g., by amination or by reacting the hydroxy groups with a diisocyanate and subsequently hydrolyzing the terminal isocyanate group to an amino group. Preferred high molecular weight polyamines are amine-terminated polyethers such as the Jeffamine resins available from Texaco.

Suitable aldehydes are those corresponding to the formula

wherein
$R_1$ and $R_2$ may be the same or different and represent optionally substituted hydrocarbon radicals, preferably containing 1 to 10, more preferably 1 to 6, carbon atoms, or $R_1$ and $R_2$ together with the β-carbon atom form a cycloaliphatic or heterocyclic ring.
Examples of suitable aldehydes include isobutyraldehyde, 2-ethyl hexanal, 2-methyl butyraldehyde, 2-ethyl butyraldehyde, 2-methyl valeraldehyde, 2,3-dimethyl valeraldehyde, 2-methyl undecanal and cyclohexane carboxyaldehyde.
The aldimines may be prepared in known manner by reacting the polyamines with the aldehydes either in stoichiometric amounts or with an excess of aldehyde. The excess aldehyde and the water which is produced can be removed by distillation. The reactions may also be carried out in solvents, other than ketones. The solvents may also be removed by distillation after completion of the reaction.

The polyisocyanates and aldimines are used in amounts sufficient to provide an equivalent ratio of isocyanate groups to aldimine groups of 0.5:1 to 20:1, preferably 0.8:1 to 3:1 and more preferably 1:1 to 2:1.

The allophanate polyisocyanates may also be used in one-component coating compositions. High-quality gloss coatings are obtained by curing with atmospheric moisture.

The coating compositions according to the invention may optionally contain known additives such as pigments, dyes, fillers and flow control agents. The components are thoroughly mixed together and homogenized in a standard mixing unit, for example a dissolver, in the presence or absence of solvents and diluents.

The lacquers and coating compositions may be applied to the substrate to be coated in solventless, liquid form, in solution or from the melt by standard methods such as spread coating, roll coating, casting and spray coating.

The coating compositions containing the polyisocyanates according to the invention provide films which adhere surprisingly well to metallic substrates, are particularly light-stable, color-stable on exposure to heat and highly abrasion-resistant and, provided that they are used in air-drying lacquers, dry particularly quickly, even at temperatures around 0° C. They are also distinguished by considerable hardness, elasticity, very high resistance to chemicals, high gloss, excellent weathering resistance and good pigmentability.

The invention is illustrated by the following examples in which all parts and percentages are by weight unless otherwise indicated.

EXAMPLES

Polyisocyanate 1

To a 5 liter, three neck flask equipped with a bubbling tube, stirrer and thermometer were added 100 parts of 1,6-diisocyanatohexane (HDI), 2.5 parts of 1,2-propylene glycol, 2.0 parts of 1-butanol and 0.026 g of stannous octoate. The mixture was bubbled with dry nitrogen and then heated over a 15 minute period to 90° C. After 50 minutes at 90° C., 0.41 g of bis-(2-ethylhexyl) phosphate was added and the reaction mixture was quench cooled to 25° C. The crude NCO content was 39.0%. The excess HDI was removed by wiped thin-film evaporation to provide a product having an NCO content of 19.4%, a yield of 33%, a viscosity of 985 mpa.s at 25° C., a free monomer (HDI) content of 0.07% and an APHA color of 30.

Polyisocyanate 2

The preparation of polyisocyanate 1 was repeated with the exception that 0.9 parts of 1,2-propylene glycol and 3.0 parts of 1-butanol were used as the alcohol mixture. The crude NCO content was 42.1%. After excess HDI was removed by wiped thin-film evaporation, the resulting product had an NCO content of 19.3%, a yield of 25%, a viscosity of 213 mPa.s at 25° C., a free monomer (HDI) content of 0.25% and an APHA color of 35.

Polyisocyanate 3

The preparation of polyisocyanate 1 was repeated with the exception that 1.2 parts of diethylene glycol and 3.0 parts of 1-butanol were used as the alcohol mixture. The crude NCO content was 42.0%. After excess HDI was removed by wiped thin-film evaporation, the resulting product had an NCO content of 19.1%, a yield of 27%, a viscosity of 228 mpa.s at 25° C., a free monomer (HDI) content of 0.16% and an APHA color of 30.

Polyisocyanate 4—Comparison

The preparation of polyisocyanate 1 was repeated with the exception that 4.0 parts of 1-butanol were used instead of the alcohol mixture. The crude NCO content was 43.3%. After excess HDI was removed by wiped thin-film evaporation, the resulting product had an NCO content of 19.9%, a yield of 20%, a viscosity of 82 mpa.s at 25°C., a free monomer (HDI) content of 0.7% and an APHA color of 50.

Polyisocyanate 5—Comparison

A mixture containing 70 parts by weight of a uretdione group-containing polyisocyanate, i.e., dimerized HDI and 30 parts by weight of N,N',N"-tris-(6-isocyanatohexyl)-isocyanurate together with minor quantities of higher homologs of both products. In its 100% solvent free form, the polyisocyanate had an average viscosity of 150 mpa.s at 23° C. and an average NCO content of 22.5% (available from Bayer Corp. as Desmodur N 3400).

Aldimine 1

116 parts of hexamethylene diamine (1.0 mole) were charged at ambient temperature into a three neck, 500 ml flask equipped with a mechanical stirrer, thermometer, and an addition funnel. 147.4 g of isobutyraldehyde (2.05 moles) were added dropwise via the addition funnel to the stirred contents of the flask at a rate such that the exotherm of the reaction did not increase the temperature of the reaction mixture above 50° C. During the course of the reaction water is generated as a by-product which is evidenced by the gradual change in the appearance of the reaction contents to a milky white mixture. Upon complete addition of the aldehyde, the reaction mixture is heated to maintain a temperature of 50° C. for a period of 1 hour. The water (36 parts; 2 moles) and excess isobutyraldehyde were removed by azeotropic distillation, followed by a vacuum (about 1 torr) stripping step to remove trace quantities of water. The finished product was a clear, almost colorless (<100 APHA) liquid having a viscosity of 10 mpa.s (25° C.) and an equivalent weight of 112 g/eq.

Example 1

Preparation of polyurea coating compositions

Polyurea coating compositions were prepared at ambient temperature by mixing the aldimine co-reactant with the corresponding polyisocyanate at 100% solids and at an NCO to N equivalent ratio of 1:1. Byk 358 (Byk Chemie) was added as a flow aid (0.5 weight % based on solids) to all formulations. These coating systems were cured at ambient temperature and humidity conditions. Compatibility of the coating systems (listed in Table 1) was determined by examining the appearance and measuring the 20° and 60° gloss values of films drawn down on steel panels at 5 mil WFT. The higher the gloss values, the better the compatibility. While the cure rates and pot lives of the various systems varied slightly depending on the nature of the polyisocyanate, all systems cured to give coatings with excellent performance properties.

| Polyisocyanate | Weight % ratio | 20° Gloss | 60° Gloss |
| --- | --- | --- | --- |
| Polyiso 1 | 100% | 81 | 93 |
| Polyiso 2 | 100% | 75 | 95 |
| Polyiso 3 | 100% | 78 | 94 |
| Polyiso 4 (Comp) | 100% | 82 | 100 |
| Polyiso 5 | 100% | 3 | 8 |
| Polyiso 1/ Polyiso 5 | 17/83% | 13 | 46 |
|  | 29/71% | 21 | 62 |

-continued

| Polyisocyanate | Weight % ratio | 20° Gloss | 60° Gloss |
| --- | --- | --- | --- |
|  | 38/62% | 70 | 89 |
|  | 44/56% | 74 | 93 |
| Polyiso 2/ | 17/83 | 05 | 20 |
| Polyiso 5 |  |  |  |
|  | 29/71 | 12 | 46 |
|  | 38/62 | 25 | 46 |
|  | 44/56 | 20 | 60 |
|  | 62/38 | 79 | 93 |
|  | 83/17 | 80 | 90 |
| Polyiso 3/ | 17/83 | 06 | 25 |
| Polyiso 5 |  |  |  |
|  | 29/71 | 57 | 86 |
|  | 38/62 | 60 | 86 |
|  | 44/56 | 40 | 81 |
| Polyiso 4/ | 20/80% | 4 | 16 |
| Polyiso 5 |  |  |  |
| (Comp) |  |  |  |
|  | 40/60% | 6 | 30 |
|  | 60/40% | 20 | 65 |
|  | 80/20% | 44 | 82 |

The preceding table demonstrates the unexpected ability of the polyisocyanates according to the invention to compatibilize an incompatible polyisocyanate adduct such as Polyisocyanate 5. Blends of Polyisocyanates 1, 2 and 3 with Polyisocyanate 5 improved the gloss readings for coatings based on these polyisocyanates mixtures. To the contrary blends of Polyisocyanate 4 with Polyisocyanate 5 did not result in the same level of improvement. This is surprising because individually Polyisocyanate 4 performed as well as Polyisocyanates 1, 2 and 3. While Polyisocyanate 4 did contain allophanate groups, it was not prepared from a mixture of monohydroxy compounds and polyhydric alcohols according to the invention.

Example 2

Example 8 of U.S. Pat. No. 4,810,820 was repeated using the same heat up, reaction and cool down times, reactants and reaction temperature set forth in Table 1 of the patent. The starting materials contained 0.0593 OH equivalents of 2,5-hexane diol and 0.0595 equivalents of 2-butanol. When each of these hydroxy equivalents are reacted with isocyanate groups, they correspond to 0.1188 equivalents of urethane groups.

The resulting products containing allophanate groups were analyzed by GPC to determine the percentage of urethane groups that were not converted to allophanate groups. In this regard it was assumed that the area percent of urethane groups corresponded to the weight percent of urethane groups. The diurethane of 2,5-hexane diol had an area percent of 4.95, which corresponded to 0.0109 equivalents of urethane groups that were not converted to allophanate groups. The monourethane of 2-butanol had an area percent of 3.03, which corresponded to 0.0125 equivalents of urethane groups that were not converted to allophanate groups. By dividing the total number of equivalents of urethane groups present after the reaction (0.0234 equivalents) by the total number of urethane groups available for conversion to allophanate groups (0.1188 equivalents), it was determined that 19.7 mole percent of the urethane groups remained and that only 80.3 mole percent of the urethane groups were converted to allophanate groups.

The total of 80.3 mole percent is higher than the actual conversion because it does not take into account the fact that urethane groups are present in the form of the monourethane of 2,5-hexane diol, which could not be detected separately. For purposes of the preceding calculations it was assumed that these monourethanes were converted to allophanate groups.

Example 3

Example 19 of U.S. Pat. No. 4,810,820 was repeated using the same heat up, reaction and cool down times, reactants and reaction temperature set forth in Table 2 of the patent. Instead of preparing the product in a continuous manner it was prepared in the batch manner used to prepare the products in Table 1 of the patent. The starting materials contained 0.075 OH equivalents of neopentyl glycol and 0.0405 equivalents of 1-butanol. When each of these hydroxy equivalents are reacted with isocyanate groups, they correspond to 0.1155 equivalents of urethane groups.

The resulting products containing allophanate groups were analyzed by GPC to determine the percentage of urethane groups that were not converted to allophanate groups. In this regard it was assumed that the area percent of urethane groups corresponded to the weight percent of urethane groups. The diurethane of neopentyl glycol had an area percent of 4.1, which corresponded to 0.0186 equivalents of urethane groups that were not converted to allophanate groups. The monourethane of 1-butanol had an area percent of 2.8, which corresponded to 0.0116 equivalents of urethane groups that were not converted to allophanate groups. By dividing the total number of equivalents of urethane groups present after the reaction (0.0302 equivalents) by the total number of urethane groups available for conversion to allophanate groups (0.1155 equivalents), it was determined that 26.2 mole percent of the urethane groups remained and that only 73.8 mole percent of the urethane groups were converted to allophanate groups.

The total of 73.8 mole percent is higher than the actual conversion because it does not take into account the fact that urethane groups are present in the form of the monourethane of neopentyl glycol, which could not be detected separately. For purposes of the preceding calculations it was assumed that these monourethanes were converted to allophanate groups.

Discussion:

The reason that the percent conversion of urethane groups to allophanate groups set forth in Examples 2 and 3 is different from the percent conversion set forth in U.S. Pat. No. 4,810,820 is that the latter was based on the assumption that every isocyanate group reacted with a urethane group to form an allophanate group. This is not a valid assumption because isocyanate groups can react to form minor amounts of other isocyanate adducts such as isocyanurate, uretdione, biuret, cardodiimide, urea groups, etc. Because isocyanate groups are consumed in the formation of these other adduct groups and, thus do not all react with urethane groups to form allophanate groups, the percent conversion to allophanate groups set forth in U.S. Pat. No. 4,810,820 is higher than the actual percent conversion.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising
a) an aldimine corresponding to the formula

$$X-[N=CHCH(R_1)(R_2)]_n$$

wherein
X represents an organic group which has a valency of n and is inert towards isocyanate groups at a temperature of 100° C. or less,
$R_1$ and $R_2$ may be the same or different and represent organic groups which are inert towards isocyanate groups at a temperature of 100° C. or less, or $R_1$ and $R_2$ together with the β-carbon atom form a cycloaliphatic or heterocyclic ring and n represents an integer with a value of at least 2, and b) a polyisocyanate which
   i) contains 2 to 35% by weight of allophanate groups, based on the weight of the polyisocyanate,
   ii) has a viscosity of less than 3000 mPa.s at 25° C. when measured at a solids content of 100%,
   iii) is based on the reaction product of an aliphatic polyisocyanate with
      1) 10 to 90 mole percent of a monohydroxy compound and
      2) 10 to 90 mole percent of a polyhydric alcohol, wherein the mole percentages of 1) and 2) add up to 100, and the percentages are based on the total moles of monohydroxy compound 1) and polyhydric alcohol 2).
   iv) contains less than 10 mole percent of urethane groups, based on the total moles of urethane groups obtained from monohydroxy compound 1) and polyhydric alcohol 2).

2. The composition of claim 1 wherein said monohydroxy compound is a linear or branched, aliphatic alcohol having a molecular eight of 32 to 400.

3. The composition of claim 1 wherein said polyhydric alcohol is a linear or branched, aliphatic polyhydric alcohol having a molecular weight of 62 to 400.

4. The composition of claim 2 wherein said polyhydric alcohol is a linear or branched, aliphatic polyhydric alcohol having a molecular weight of 62 to 400.

5. The composition of claim 1 wherein said polyisocyanate is based on the reaction product of an aliphatic polyisocyanate with
   1) 20 to 80 mole percent of a monohydroxy compound and
   2) 20 to 80 mole percent of a polyhydric alcohol.

6. The composition of claim 4 wherein said polyisocyanate is based on the reaction product of an aliphatic polyisocyanate with
   1) 20 to 80 mole percent of a linear or branched, aliphatic alcohol having a molecular weight of 32 to 250 and
   2) 20 to 80 mole percent of a linear or branched, aliphatic polyhydric alcohol having a molecular weight of 62 to 250.

7. The composition of claim 1 wherein said aldimine comprises 1,6-diaminohexane.

8. The composition of claim 4 wherein said aldimine comprises 1,6-diaminohexane.

9. A polyisocyanate which
   i) contains 2 to 35% by weight of allophanate groups, based on the weight of the polyisocyanate,
   ii) has a viscosity of less than 3000 mpa.s at 25° C. when measured at a solids content of 100%,
   iii) is based on the reaction product of an aliphatic polyisocyanate with
      1) 10 to 90 mole percent of a monohydroxy compound and
      2) 10 to 90 mole percent of a polyhydric alcohol, wherein the mole percentages of 1) and 2) add up to 100, and the percentages are based on the total moles of monohydroxy compounds 1) and polyhydric alcohols 2) and
   iv) contains less than 10 mole percent of urethane groups, based on the total moles of urethane groups obtained from monohydroxy compound 1) and polyhydric alcohol 2).

10. The polyisocyanate of claim 9 wherein said monohydroxy compound is a linear or branched, aliphatic alcohol having a molecular weight of 32 to 400.

11. The polyisocyanate of claim 9 wherein said polyhydric alcohol is a linear or branched, aliphatic polyhydric alcohol having a molecular weight of 62 to 400.

12. The polyisocyanate of claim 10 wherein said polyhydric alcohol is a linear or branched, aliphatic polyhydric alcohol having a molecular weight of 62 to 400.

13. The polyisocyanate of claim 9 wherein said polyisocyanate is based on the reaction product of an aliphatic polyisocyanate with
    1) 20 to 80 mole percent of a monohydroxy compound and
    2) 20 to 80 mole percent of a polyhydric alcohol.

14. The polyisocyanate of claim 12 wherein said polyisocyanate is based on the reaction product of an aliphatic polyisocyanate with
    1) 20 to 80 mole percent of a linear or branched, aliphatic alcohol having a molecular weight of 32 to 250 and
    2) 20 to 80 mole percent of a linear or branched, aliphatic polyhydric alcohol having a molecular weight of 62 to 250.

15. A polyisocyanate mixture which comprises

A) at least 10% by weight, based on the resin solids of the polyisocyanate mixture, of a polyisocyanate which
   i) contains 2 to 35% by weight of allophanate groups, based on the weight of the polyisocyanate,
   ii) has a viscosity of less than 3000 mpa.s at 25° C. when measured at a solids content of 100%,
   iii) is based on the reaction product of an aliphatic polyisocyanate with
      1) 10 to 90 mole percent of a monohydroxy compound and
      2) 10 to 90 mole percent of a polyhydric alcohol, wherein the mole percentages of 1) and 2) add up to 100, and the percentages are based on the total moles of monohydroxy compounds 1) and polyhydric alcohols 2) and
   iv) contains less than 10 mole percent of urethane groups, based on the total moles of urethane groups obtained from monohydroxy compound 1) and polyhydric alcohol 2), and B) at least 10% by weight, based on the resin solids of the polyisocyanate mixture, of a polyisocyanate adduct containing isocyanurate, uretdione, biuret and/or urethane groups other than polyisocyanate A).

16. The polyisocyanate mixture of claim 15 wherein said monohydroxy compound is a linear or branched, aliphatic alcohol having a molecular weight of 32 to 400.

17. The polyisocyanate mixture of claim 15 wherein said polyhydric alcohol is a linear or branched, aliphatic polyhydric alcohol having a molecular weight of 62 to 400.

18. The polyisocyanate mixture of claim 16 wherein said polyhydric alcohol is a linear or branched, aliphatic polyhydric alcohol having a molecular weight of 62 to 400.

19. The polyisocyanate mixture of claim 15 wherein said polyisocyanate is based on the reaction product of an aliphatic polyisocyanate with
    1) 20 to 80 mole percent of a monohydroxy compound and
    2) 20 to 80 mole percent of a polyhydric alcohol.

20. The polyisocyanate mixture of claim 18 wherein said polyisocyanate is based on the reaction product of an aliphatic polyisocyanate with
    1) 20 to 80 mole percent of a linear or branched, aliphatic alcohol having a molecular weight of 32 to 250 and
    2) 20 to 80 mole percent of a linear or branched, aliphatic polyhydric alcohol having a molecular weight of 62 to 250.

* * * * *